US009371977B2

(12) United States Patent
Guiset et al.

(10) Patent No.: US 9,371,977 B2
(45) Date of Patent: Jun. 21, 2016

(54) GLASS-CERAMIC ARTICLE HAVING A COLORED LUMINOUS DISPLAY

(75) Inventors: Pierrick Guiset, Massy (FR); Jean-Yves Laluet, Paris (FR); Claire Mallet, Outremont (CA); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 117 days.

(21) Appl. No.: 14/124,952

(22) PCT Filed: Jun. 14, 2012

(86) PCT No.: PCT/FR2012/051333
§ 371 (c)(1),
(2), (4) Date: Jan. 8, 2014

(87) PCT Pub. No.: WO2012/172257
PCT Pub. Date: Dec. 20, 2012

(65) Prior Publication Data
US 2014/0146530 A1    May 29, 2014

(30) Foreign Application Priority Data

Jun. 15, 2011 (FR) .................................... 11 55204

(51) Int. Cl.
*F21V 9/10* (2006.01)
*G09F 9/33* (2006.01)
(Continued)

(52) U.S. Cl.
CPC ................. *F21V 9/10* (2013.01); *C03C 17/002* (2013.01); *C03C 17/007* (2013.01); *F24C 7/083* (2013.01);
(Continued)

(58) Field of Classification Search
CPC ....... F21C 7/082; G09F 9/33; G09F 23/0058; H05B 3/746; H05B 6/1218; H05B 6/1209; C03C 17/002; C03C 17/007; C03C 2217/485; Y10T 29/49826; F24C 15/102; H03K 17/941; F21V 9/10
See application file for complete search history.

(56) References Cited

U.S. PATENT DOCUMENTS 6,376,809 B1 * 4/2002 Huber ................. H05B 1/0266
                                              219/445.1
2003/0183617 A1 * 10/2003 Platt ....................... F24C 7/083
                                              219/452.11
(Continued)

FOREIGN PATENT DOCUMENTS

DE      103 09 225       9/2004
DE   10 2008 012 602     9/2009
(Continued)

OTHER PUBLICATIONS

International Search Report Issued Sep. 5, 2012 in PCT/FR12/051333 Filed Jun. 14, 2012.
(Continued)

*Primary Examiner* — Bao Q Truong
(74) *Attorney, Agent, or Firm* — Oblon, McClelland, Maier & Neustadt, L.L.P (57) ABSTRACT

The present invention relates to an article having at least one colored luminous zone, in particular a display zone, said article comprising at least one glass-ceramic substrate having a luminous transmission ranging from 0.8% to 40% and an optical transmission of at least 0.1% for at least one wavelength in the range extending from 420 to 780 nm, at least one light source and at least one filter so as to form at least one colored luminous zone, in particular a display zone, in at least one zone of the plate.

17 Claims, 4 Drawing Sheets (51) Int. Cl.
  *C03C 17/00* (2006.01)
  *G09F 23/00* (2006.01)
  *F24C 7/08* (2006.01)
  *F24C 15/10* (2006.01)

(52) U.S. Cl.
  CPC . *F24C 15/10* (2013.01); *G09F 9/33* (2013.01); *G09F 23/0058* (2013.01); *C03C 2217/485* (2013.01); *Y10T 29/49826* (2015.01)

(56) References Cited

U.S. PATENT DOCUMENTS

| | | |
|---|---|---|
| 2005/0252754 A1 | 11/2005 | Arnold |
| 2007/0108184 A1 | 5/2007 | Imamoto et al. |
| 2009/0090605 A1 | 4/2009 | Arione et al. |
| 2010/0155206 A1 | 6/2010 | Arione et al. |
| 2013/0286630 A1 | 10/2013 | Guiset et al. |
| 2014/0009370 A1* | 1/2014 | Weiss .................... F24C 7/082 345/32 |

FOREIGN PATENT DOCUMENTS

| | | |
|---|---|---|
| DE | 20 2010 014 361 | 2/2011 |
| EP | 2 048 781 | 4/2009 |
| JP | 2005 93209 | 4/2005 |

OTHER PUBLICATIONS

U.S. Appl. No. 14/442,619, filed May 13, 2015, Laluet, et al.
U.S. Appl. No. 14/421,678, filed Feb. 13, 2015, Laluet, et al.

* cited by examiner

GLASS-CERAMIC ARTICLE HAVING A COLORED LUMINOUS DISPLAY

The present invention relates to the field of glass-ceramics. More precisely, it relates to an article (or product) made of glass-ceramic, and especially to a glass-ceramic plate, intended in particular to cover or contain heating elements, said article being provided with a luminous color display (or at least one colored luminous zone) in at least one chosen zone of the article.

Sales of articles such as hotplates made of glass-ceramic have been increasing constantly for several years. This success is especially explained by the attractive appearance of these plates and because they are easy to clean.

It will be recalled that glass-ceramic is initially glass, this glass being called the precursor glass (or green glass), the specific chemical composition of which is allows, via suitable heat treatments called ceramization treatments, controlled crystallization of the glass. This specific, partially crystallized structure provides the glass-ceramic with unique properties.

There are currently various type of glass-ceramic plates, each variant being the result of long studies and many trials, it being given that it is very difficult to modify these plates and/or the process for obtaining them without risking adversely affecting the desired properties: in order to be employed as a hotplate, a glass-ceramic plate must in general have a transmission in the visible wavelength range that is both sufficiently low to at least partially hide the underlying heating elements when turned off and sufficiently high that, depending on the case (radiative heating, induction heating, etc.), the user can see whether the heating elements are turned on—for the sake of safety. The glass-ceramic plate must also have a high transmission at wavelengths in the infrared range, especially in the case of radiant heaters.

Most plates are currently dark, especially black, in color, this color being obtained for example by adding vanadium oxide to the batch materials of the green glass before it is melted, this oxide providing, after ceramization, a strong orange-brown color associated with reduction of the vanadium. Other dyes, such as cobalt oxide and manganese oxide, may also be used. Because they have a low transmission coefficient below 600 nm, these plates especially allow red elements, such as hot heating elements or indeed luminous displays based on monochromatic red light-emitting diodes, to be seen. More transparent glass-ceramic plates (such as the glass-ceramics KeraVision or KeraResin, sold by EuroKera) also exist and allow other "pure" colors (colors produced by monochromatic diodes), such as blue and green, to be displayed.

However, recently it has become necessary to display a greater variety of information with a greater variety of colors, in particular synthetic colors produced by mixing a number of wavelengths (the case for the color white). Since the transmission coefficient of glass-ceramic plates is not uniform over the entire visible spectrum, the relative amplitudes of the various (spectral) components of the transmitted light are however generally modified, the color after transmission possibly being very different to that produced by the source.

In particular, technologies based on light-emitting diodes (LEDs), commonly employed to produce white light (for example using a source of blue light covered with a phosphor that absorbs some of said light and reemits yellow light), cannot be used to produce a white color through a glass-ceramic. While the balance between the blue and yellow light is initially such that mixing them provides the viewer with the impression of white light, since this light passes through the glass-ceramic, which does not absorb uniformly (the blue is strongly absorbed and the yellow less so), the viewer does not perceive the color white through the glass-ceramic but sees, for example, the color pink, orange or red.

Likewise, it is not appropriate to use polychromatic LEDs (for example formed by three monochromatic sources the brightnesses of which are independently adjusted, such as RGB LEDs with three sources: red, green and blue) to produce white light, for example, since the nonuniform absorption of the glass-ceramic over the visible range changes the balance between the colors producing a pink, orange or red rendering. The respective brightness of the RGB components can be adjusted, but the mixing must be perfect (especially in space—good overlap of the light beams—and in time—same phase, especially if the beams are to be amplitude modulated) if nonuniformities are to be avoided. The distance separating the three emitting zones is often the cause of poor mixing, leading to a nonuniform color. Likewise, the three R, G and B chips are subject to temperature drift and they age at different rates, leading to nonuniformities in color appearing over time. Furthermore, depending on the manufacturing batch of the red, green and blue LEDs, the color of the RGB LEDs varies from one LED to another. RGB LEDs are also more bulky than the LEDs commonly used in display units, and are more difficult to incorporate into a control panel.

For these reasons, white displays, or displays in most colors other than red, in particular in synthetic colors, are not used with glass-ceramics, especially dark or colored glass-ceramics, due to their nonuniform absorption over the visible range since any non-monochromatic light passing through them sees its color modified, and the wider the spectrum is the more critical this becomes, i.e. white sources.

The aim of the present invention is therefore to provide new and improved glass-ceramic articles (such as plates) and in particular to provide new state-of-the-art glass-ceramic articles with luminous displays in a more varied range of colors, especially colors other than red, and in particular white, this display not having the drawbacks mentioned above, providing a wide range of precise colors and having particular and advantageous application to dark-colored and/or very absorbent plates and/or plates that are themselves colored.

This object is obtained by the new article according to the invention, the article having at least one colored (in the wider sense, also including white) luminous zone (in particular a display zone), said article comprising at least one glass-ceramic substrate (in particular a plate intended for example to cover or contain at least one heating element) having a luminous transmission ranging from 0.8% to 40% and an optical transmission of at least 0.1% for at least one wavelength in the range extending from 420 to 780 nm (located in the visible range), at least one light source (and/or a display unit incorporating said source) and at least one filter (coupled (in operation) to said source (and likewise to the plate, the colored zone obtained especially resulting from (the action/effect of) these three components)) so as to form, in particular, at least one colored luminous zone (or area or region), especially a display (display of information/symbols or decorative patterns for example), in at least one zone (or area or region) of the plate. As explained below, this filter may especially be combined (in terms of position) with the source and/or the plate.

The term "filter" is understood to mean an optical filter (acting on the transmission of the light), in particular a color filter (the filter affecting light transmission as a function of wavelength), this filter in particular being a generally flat element (body, medium, material) especially taking the form of a film or layer or composite based on at least one (semi)

transparent (especially in the sense that it is transparent at certain wavelengths in the visible and not transparent to/opaque/it affects other wavelengths, this filter furthermore generally having a luminous transmission of at least 5%, especially at least 20%, and in particular at least 30%) organic or mineral material, in particular allowing certain wavelengths in the visible spectrum to be absorbed and/or reflected and/or reemitted. It is particularly advantageous for the filter to be an absorption filter (the filter affecting the transmission of the light by absorbing certain wavelengths, the light absorbed to possibly, in particular, being converted to heat and/or emitted at other wavelengths). According to another embodiment, this filter is a reflection filter (the filter affecting the transmission of the light by reflecting certain wavelengths). The filter may be an additional element (manufactured separately) and may especially be combined with the light source (or with a number of light sources) and/or with is the glass-ceramic substrate, or it may be incorporated in or produced directly on the glass-ceramic substrate and/or optionally on at least one light source and/or an intermediate element, as will be explained below. At least one light source is coupled (in operation) to at least one such corrective filter (i.e. the light it emits passes through said filter) in order to produce the desired display through the glass-ceramic substrate with which this assembly is combined.

The aforementioned filter is chosen depending on (or is specific to, or as a function of) the glass-ceramic (i.e. on the optical transmission—or spectral transmission or dispersion—of the glass-ceramic, the optical/spectral transmission itself depending on the composition and the thickness of said substrate) and possibly on the light source, as explained below, so as to form at least one colored luminous zone with set color coordinates, in particular a colored zone having a color other than red, and especially a white colored zone or a color zone of a synthetic color obtained by mixing a number of wavelengths.

The expressions "glass-ceramic articles" or "articles made of glass-ceramic" are understood to mean not only articles made of actual glass-ceramic but also articles made of any analogous material suited to the same applications (for example glass whether reinforced or not), in particular any material able to withstand high temperatures and/or especially having a zero or almost zero thermal expansion coefficient (for example a thermal expansion coefficient of less than $1.5 \times 10^{-7}$ $K^{-1}$, as in the case of the glass-ceramic plates used with radiant heaters). However, the article is preferably made of actual glass-ceramic.

The article according to the invention may advantageously be a hotplate, but may also be any other article, made of a glass-ceramic, with a functional or decorative display, or even an article or module or assembly or system (primarily) acting as a (decorative and/or functional) display having at least one light source coupled to at least one corrective filter, this assembly being coupled to at least one glass-ceramic article, in particular a glass-ceramic plate, according to the invention.

Preferably, the article (substrate) according to the invention is formed by a flat, or mainly or almost flat (in particular deviating from planarity along a diagonal by less than 0.1%, preferably by about 0%) glass-ceramic plate (generally of between 3 and 4 mm in thickness, especially about 4 mm in thickness), and it is intended to be used as a hotplate. Such a plate is generally intended to be incorporated in a stove or range comprising said plate and heating elements, for example radiant or halogen heaters or induction heating elements.

In use, the plate generally has an "upper" face (visible face), another "lower" face (often hidden in the chassis or casing of a range for example) and an edge face (or side face or thickness). The upper face is generally flat and smooth but may also comprise at least one protruding and/or recessed zone and/or at least one aperture (for example if the plate includes an opening intended for housing a gas burner). The lower face may especially be smooth or comprise studs that increase its strength, obtained by rolling for example. As required, if studs are used, an index resin may be applied to the lower surface in order to smooth it, if this is necessary to allow a filter to be added to this face.

The article according to the invention is advantageously based on any glass-ceramic that has an intrinsic luminous transmission ranging from 0.8% to 40% (in particular from 2.3 to 40%) and an intrinsic optical transmission (defined as is known by the ratio of the transmitted intensity to the incident intensity at a given wavelength) of at least 0.1% for at least one wavelength lying in the visible range above 420 nm (and up to 780 nm), and preferably of at least 0.1% for all wavelengths in the range extending from 420 to 780 nm. The term "intrinsic" is understood to mean that the plate possesses such transmission properties itself, uncoated. The luminous transmission is measured according to ISO standard 9050:2003 (which also mentions optical transmission) under illuminant D65, and is the total transmission (especially integrated over the visible range and weighted by the sensitivity curve of the human eye) including both direct transmission and any scattered transmission, this measurement being made for example using a spectrophotometer equipped with an integrating sphere, the value measured for a given thickness then being converted, if required, to the ISO standard 9050:2003 reference thickness of 4 mm. The invention is in particular advantageously applicable to dark, especially brown or black, plates meeting such transmission criteria, but the glass-ceramic used, meeting such criteria, may also be a clear glass-ceramic, the solution according to the invention allowing a luminous display having the exact color desired to be obtained, while being very easily and simply modifiable over the entire range of plates, and there being no risk of altering other properties of the plates.

In a first embodiment, the glass-ceramic is in particular a dark glass-ceramic (especially such that the L* value in the CIE color system, calculated from the transmission spectrum of said glass-ceramic over the visible range, is lower than 70%) having a luminous transmission in the visible of 0.8% to 5%, in particular from 0.8 to 2.5% and having an optical transmission higher than 0.1% for at least one wavelength in the visible range above 450 nm.

In another advantageous embodiment, the glass-ceramic is of the lithium aluminosilicate type and has an intrinsic luminous transmission ranging from 2.3% to 40%, in particular higher than 2.5%, especially higher than 3.5%, and an intrinsic optical transmission of at least 0.6% for at least one wavelength in the range extending from 420 to 480 nm. In this case, whether the glass-ceramic is clear or dark, it preferably comprises at least one masking means intended to mask at least some of the associated underlying elements (especially heating means) if required, excluding the light-emitting devices/illuminated zones and if required radiation heating means, the filter(s) being in this case essentially used in the unmasked luminous zones.

In particular, advantageously, a glass-ceramic comprising the following constituents and/or obtained by ceramization of glass having the following composition is used, within the ranges below, expressed in percentages by weight: $SiO_2$: 52-75%; $Al_2O_3$: 18-27%; $Li_2O$: 2.5-5.5%; $K_2O$: 0-3%; $Na_2O$: 0-3%; ZnO: 0-3.5%; MgO: 0-3%; CaO: 0-2.5%; BaO: 0-3.5%; SrO: 0-2%; $TiO_2$: 1.2-5.5%; $ZrO_2$: 0-3%; $P_2O_5$:

0-8%, and preferably, within the ranges below, expressed in percentages by weight: $SiO_2$: 64-70%; $Al_2O_3$: 18-21%; $Li_2O$: 2.5-3.9%; $K_2O$: 0-1.0%; $Na_2O$: 0-1.0%; ZnO: 1.2-2.8%; MgO: 0.20-1.5%; CaO: 0-1%; BaO: 0-3%; SrO: 0-1.4%; $TiO_2$: 1.8-3.2%; $ZrO_2$: 1.0-2.5%.

The glass-ceramic may also comprise up to 1 wt % of nonessential constituents that do not affect melting of the green glass or the subsequent devitrification that results in the glass-ceramic. Dyes may especially be added to the composition in the case for example of black or brown glass-ceramics. For example, the composition of the plate may advantageously comprise vanadium oxide in an amount of between 0.01% and 0.2%, preferably 0.05% or less, even 0.04% or less. The amount of vanadium oxide used is preferably between 0.01 and 0.03%.

The glass-ceramic may also contain, so as to hide the heating elements, and optionally in combination with the vanadium oxide, the following other dyes (ranges by weight): $Fe_2O_3$: 0-0.2%, CoO: 0-1% and preferably 0-0.12%, and even NiO, CuO and/or MnO. The glass-ceramic may also comprise tin oxide (or other reducing agents such as metal sulfides) in an amount smaller than 0.5%, the tin oxide promoting the reduction of the vanadium during the ceramization step, especially causing color to appear.

The dark glass-ceramic preferred according to the invention generally comprises β-quartz crystal structures within a residual vitreous phase, and the absolute value of its thermal expansion coefficient is advantageously $15 \times 10^{-7}/°$ C. or less, even $5 \times 10^{-7}/°$ C. or less.

By selecting glass-ceramics, which although possibly dark have the selected luminous and optical transmissions described above, and combining them with filters selected as required, as mentioned above, in order to compensate or correct, in a controlled way, the spectral dispersion of the glass-ceramic, it is possible to obtain the desired color rendering whatever the initial spectrum of the light source viewed through said glass-ceramic, without being limited by the choice of light sources or forced to perform complicated conversion procedures on said sources or the glass-ceramic. The filter, chosen depending on the glass-ceramic and possibly the source (depending on the intended objective, as explained below, in particular in the case where it is desired to correct the luminous flux emitted), allows the desired transmission to be obtained from the filter/glass-ceramic assembly (the color being corrected or a neutral transmission, i.e. a transmission that does not alter the initial color of the source, being obtained). The invention is suitable for dark or colored glass-ceramic plates meeting the transmission criteria, the invention controlling the color function of their display(s). The invention enables, for a given color source, a given target color to be obtained, and in particular final displays/display units to be produced that are optionally identical in color to the initial color, especially white display units or display units of colors previously not used with glass-ceramics. The invention also makes it possible to produce zones of different colors over one glass-ceramic, by associating particular colors with different spaces or functions, for example.

As defined above, the article according to the invention also comprises at least one light source, possibly a continuous or discontinuous source, and if required comprises a number of sources (their number and arrangement possibly is being varied to make the illumination more uniform). The one or more sources may be integrated in/coupled to one or more display unit structures (for example to seven-segment light-emitting diodes or liquid crystals), to an electronic control panel with touch-sensitive controls and a digital display, etc. The light sources are preferably formed by light-emitting diodes (LEDs) that are spaced apart to a greater or lesser extent, the diodes possibly being associated with one or more waveguides as discussed below. Diodes are advantageously used in the present invention, especially because of their bulk, efficiency, durability and their ability to withstand the conditions (heat, etc.) of their environment.

The diodes may be encapsulated, i.e. comprise a semiconductor component and a package (for example made of an epoxy or nylon resin) encapsulating the semiconductor component. The diodes may also be semiconductor chips without collimating lenses, for example being about one hundred microns or about a millimeter in size, optionally with minimal encapsulation (protective encapsulation for example).

The diodes may be borne by a support or strip or mounting, this mounting possibly having a treated (flat or sloped) surface and/or a surface that has been made reflective, so as to increase the luminous efficiency, for example, it may be coated with a lacquer or paint and/or a mirror layer and/or be coupled to a white or metallic reflector so as to better direct the emitted light.

The one or more sources may be joined (to the plate or to another constituent part of the article, such as the control panel for example) by soldering, clip-fastening, adhesive bonding, etc. and, if required, by way of another element. For example, the diodes, soldered to a support itself housed in a metal strip, may be fitted by clip-fastening or adhesive bonding of the strip. The positioning of the one or more sources (especially relative to the plate) is tailored to produce a display through the glass-ceramic.

The sources, and their power supply and control, may optionally be dissociated so as to allow simultaneous or separate illumination of the desired luminous zones as required. Each source may be a monochromatic (pure color) source, especially in the case where a number of monochromatic sources are combined (RGB LEDs for example) in order to emit a polychromatic spectrum (synthetic color), or may be a polychromatic source. The invention advantageously allows the nonuniform absorption, by the glass-ceramic, of the polychromatic spectrum of the one or more sources to be corrected (for example for a white LED), and is particularly applicable to articles employing polychromatic light sources (alone or in combination).

The expression "monochromatic light source" is understood to mean a light source having a single emission peak in the visible wavelength range, the peak width varying from 1 to 100 nm and preferably from 5 to 50 nm.

The expression "polychromatic light source" is understood to mean a light source that has at least two emission peaks at different wavelengths in the visible wavelength range. The color perceived (on the retina) is then a mixture of the various wavelengths. It may be an LED, and/or an LED display unit, with an emission spectrum having a main emission peak and another emission peak, for example caused by fluorescence, which is wider than the main peak and generally less bright. The polychromatic LEDs will in particular emit a first (high or low brightness) emission at between 400 and 500 nm and a second (high or low brightness) emission in the visible above 500 nm (the case for example of LEDs formed by at least one light-emitting diode and one or more photoluminescent phosphors).

White LEDs may in particular be used as sources and they may for example be fabricated using a chip of a single-crystal semiconductor, such as indium gallium nitride (InGaN), emitting in the blue, the chip being covered with a transparent resin (such as silicone or epoxy resin) containing inorganic phosphors (for example YAG:Ce) that absorb in the blue and emit in the yellow. By way of example of other advantageous polychromatic LEDs mention may in particular be made of the following LEDs or display units: the XLamp® LED or High Brightness LED range from CREE; the Nichia Helios, Nichia Rigel, LED lamps NSSM, NSSW, NSEW, NS9 and NS2 from Nichia; the white TOPLED® series and the LW Q38E, LW L283 and LW Q38G from OSRAM; the Luxeon® Rebel White and Luxeon® K2 range from Philips Lumileds; the LEDs referenced E1S19, E1S27, E1S62, E1S66, E1S67, E1SAG, E1SAP, EASAA, EASAU, EASAV, E1L4x and E1L5x from Toyoda Gosei; the LEDs referenced HSMW-C120, HSMW-C130, HSMW-C191, HSMW-C197 and HSMW-C265 from Avago Technologies; the LEDs referenced LTW-C193TS5 and LTW-C191TS5 from LITE-ON; the LEDs referenced WH104L-H, WH104-NZ and WH107 from Seoul Semiconductor; the LED referenced 19-213/T1D-KS1T1B2/3T from Everlight, etc.

Mention may also be made of the following LED-comprising display units: the white 7-segment display units referenced HDSM-431W and HDSM-433W from Avago Technologies, or referenced FN1-0391WO10JBW and FN1-0391WO50JBW from Forge Europa; Dot Matrix® matrix display units from Kingbright e.g. reference TA20-11YWA; "Bar Graph Array" bar display units from Kingbright, for example referenced DC10YWA. It will be noted that LED-comprising display units are luminous display devices the "primary" light source of which consists of one or more LEDs. These devices generally comprise luminous "segments" (for example 7-segment display units), dots (matrix display units) or bars, one segment generally being formed by a reflector, the one or more LEDs generally being inserted at one end of the reflector and the light being guided to the other (visible) end, the internal walls of the reflector possibly scattering light and/or the visible end of the segment possibly being covered with a highly transparent plastic.

As mentioned above, the article may comprise, in addition to the one or more sources, at least one waveguide intended to guide light from one part of the article to another (in particular by total internal reflection or by metallic reflection), the light source then being attached to the guide and interacting with the latter by emitting light into it so that the guide can transmit said light, the one or more light sources emitting into/being coupled to the edge or side face of the guide, for example. Advantageously this guide is clear or transparent and is generally added (joined after having been manufactured separately) to the lower face of the substrate. It may be organic and/or plastic (for example made of polycarbonate or polymethyl methacrylate PMMA) or mineral, and is preferably mineral, in particular it is glass. The article according to the invention may comprise a number of guides, each dedicated to one or more illuminated zone, or a single guide, containing apertures if required. The guide may be securely fastened to the substrate by adhesive bonding and/or clip-fastening, or by encapsulation, etc. The guide may be joined directly to the substrate or to another part of the article, or to to a support on which the article is mounted, for example in the case of a cooking module or appliance, the guide possibly being securely fastened to the casing of the cooking appliance on which the substrate is mounted (the casing possibly being part of the article, if required). The guide makes it possible, inter alia, to better transmit the light to the zones that it is desired to illuminate, in particular is when the substrate is a dark color.

The article according to the invention may also comprise, in the zone to be illuminated, at least one means for extracting the light emitted by the one or more sources, for example one or more scattering elements or treatments, in particular an extracting means such as a layer added to the surface and/or any differential treatment or texturing of the surface (local or over the entire area), of the waveguide if required, such as laser etching, a printed enamel, chemical (acid) etching, or mechanical roughening (sandblasting etc.), etc. An extraction area may also be provided, for example, in the bulk of the guide, if required, using, for example, internal laser etching technology. The one or more extraction means make it possible to extract the light from the guide in the zone that it is desired to illuminate. If required, the geometry and the roughness of the edge of a waveguide may also be worked on so as to allow local and controlled extraction of the light. The one or more extraction means may be combined, if required, with another treatment allowing the illuminated zones to be targeted, for example a mask (masking certain zones and preventing the light from passing through) screen printed on the substrate.

As defined according to the invention the claimed article also comprises at least one filter, this filter generally being placed (and in particular occupying a fixed position) between the source and the substrate and possibly being securely fastened (i.e. directly or indirectly (for example by way of another constituent element) fixed and not easily removable once in place) to the source and/or the substrate and/or optionally to another intermediate element (for example a light extraction means such as mentioned above), as will be explained below. Preferably it is securely fastened (or fixed) to the glass-ceramic.

It is possible to use various types of filter (having different constructions or operating modes), which filters act on or compensate, in a chosen controlled and reproducible way, the luminous transmission through the plate (for this purpose they have a spectral dispersion that is different to that of the glass-ceramic). These filters may be transparent colored polymers, or colored glass, the coloring being achieved by deposition or through the thickness, or by layers deposited on the sources or glass-ceramics, etc. as explained below.

As mentioned above, one or more absorption filters are preferably used (this absorption being in particular controlled using organic or inorganic compounds added as required to a glass or plastic matrix). This type of filter may for example be formed by depositing one or more organic or mineral dyes or pigments (optionally dissolved or dispersed in a medium, in particular such as a silicone, epoxy or acrylic resin, a UV-curable ink, or a sol-gel) on the surface of a transparent substrate. The substrate may be made of glass (soda-lime glass, borosilicate glass, or may be the glass-ceramic substrate itself) or a plastic/polymer (sheet of polyethylene terephthalate, in particular heat-stabilized polyethylene terephthalate, polycarbonate, acrylate, polyetheretherketone (PEEK), etc.), examples of these filters especially being the gelatin filters or polymer color filters sold by Lee Filters or Rosco. Preferably, the substrate is the glass-ceramic plate itself. The filter may be deposited by screen printing, ink-jet or laser printing, by spraying, dip-coating, by roller coating, etc. and is preferably deposited by screen printing or ink-jet printing, in particular on the plate and/or the source (and/or optionally an intermediate element) especially and advantageously by ink-jet printing.

It will be noted that the colored substances, in particular the dyes or pigments, used to produce the aforementioned filters are preferably heat resistant. Advantageously, use may for example optionally be made of a blend of polychlorinated copper phthalocyanine pigments dispersed in a resin, especially a curable polysiloxane resin, the blend for example (and advantageously) being applied (in particular by screen printing) to the lower face of the glass-ceramic. In the case of ink-jet printing (especially directly onto the glass-ceramic substrate), the inks used may especially be UV-curable inks that are temperature and light stable, such as the Anapurna M inks sold by Agfa.

The absorption filter may alternatively or simultaneously be formed by a material tinted through its thickness. This material may be a glass (especially the product SGG Stadip Color sold by Saint-Gobain Glass France) or a plastic (such as a silicone or epoxy resin or PET, PC or an acrylate). Mention may be made, by way of example, of glass optical filters, of the Schott Optical Glass Filter range sold by Schott.

The absorption filter advantageously allows the chosen effect or color to be obtained whatever the viewing angle.

In another embodiment, one or more reflection filters are used (this reflection in particular being obtained via interference in a multilayer of thin films made of various materials, a thin film being a film the thickness of which is smaller than the wavelength of the light), especially dichroic filters based on semireflective interferential (film) multilayers, etc. Such filters are for example obtained by (vacuum) physical vapor deposition (PVD) (sputtering, magnetron sputtering, evaporation) or chemical vapor deposition (CVD) of high and low refractive-index films in alternation, the substrate on which the films are deposited possibly being made of glass or a polymer. An exemplary dichroic filter is, for example, that sold under the reference C04 by Lee Filters, consisting of a dichroic (at two different angles of incidence) multilayer deposited on a glass substrate, providing a white rendering at normal incidence when it is associated with a white seven-segment display unit having the reference Avago HDSM.441W mentioned above, and a 4 mm-thick glass-ceramic of the KeraVision type mentioned above, the filter being inserted between the display unit and the glass-ceramic.

The reflection filter allows the chosen effect or color to be obtained at normal incidence (incidence perpendicular to the plate, i.e. when the plate is looked at straight on), the color perceived however possibly differs at other angles of incidence depending on the circumstances.

The choice of the filter or the combination of filters specifically appropriate to each case, for obtaining the desired target color (such as perceived by an observer) and/or the desired compensating effect (this being the case, for example, if neutral transmission through the article is desired, the source color being unaltered whatever the source), depends on the glass-ceramic plate used, on the desired color (and on the source used in this case) or on the desired effect (the case of neutral transmission, whatever the source) and on the type of filter used.

In a first embodiment, if it is desired to perfectly compensate transmission through the glass-ceramic so that the glass-ceramic/filter assembly does not alter the color from the source (neutral and constant, or approximately constant transmission, the transmission varying by about 0.5% over the transmission range considered), the required filter primarily depends on the glass-ceramic and must function whatever the light source used. It is then called a universal filter and is capable of correcting the color dispersion introduced by a glass-ceramic (in particular in the form of a plate in the present invention) of a given composition and thickness. The universal filter is selected so that the total optical transmission (transmitted luminous intensity over the incident luminous intensity/luminous intensity emitted by the source) $T_T(\lambda)$ (at each wavelength $\lambda$ considered, said transmission being measured at normal incidence, or at a more appropriate angle of incidence depending on the chosen conditions of use) through the filter/glass-ceramic assembly is (equal to a) constant over the entire spectral range considered (or for all the wavelengths considered). To do this, the minimum (optical) transmission $T_{Vmin}$ of said glass-ceramic is determined in the spectral range considered, and a filter is sought allowing a constant $T_T(\lambda)$ value equal to $T_{Vmin}$ to be obtained whatever the wavelength in the spectral range considered, with a difference $T_T(\lambda)-T_{Vmin}$ close to and preferably not exceeding 0.1, and in a particularly preferred way not exceeding 0.01 (in other words $T_T(\lambda)-T_{Vmin}$ is minimized).

Generally, the spectral range considered is the visible spectral range (all the wavelengths lying between 380 nm and 780 nm, especially between 420 and 780 nm), the transmission minimum $T_{Vmin}$ generally being located at 380 nm. The universal filter chosen allows the source color to be preserved, whatever source is used (the transmission $T_T(\lambda)$ is the same for every wavelength in the visible), only the brightness being altered (brightness obtained for $T_{Vmin}$). Alternatively, the spectral range may be much narrower (for example between 420 and 600 nm) permitting a certain color dispersion (or difference between the color perceived and the color of the source) but maximizing the final perceived brightness, in particular it may be chosen to restrict the spectral range to the range in which the human eye is most sensitive to the electromagnetic radiation received. For example, insofar as the spectral luminous efficiency $V(\lambda)$ (defined by the International Commission on Illumination), modeling the luminous flux perceived by the human eye, reaches its maximum value 1 for a wavelength of 555 nm, the $T_{Vmin}$ value considered may be that measured at about 555 nm, or else, to give another example, insofar as $V(\lambda)$ is greater than 0.5 from 510 nm to 610 nm (for photopic vision, i.e. daytime vision), the $T_{Vmin}$ value considered may be that for the spectral range lying between 510 nm and 610 nm.

Starting with $T_{Vmin}$ it is then possible to calculate the transmission $T_F(\lambda)$ of the required filter, $T_T(\lambda)$ depending on the transmission $T_F(\lambda)$ of the filter and on that of the glass-ceramic $T_v(\lambda)$, the relationship between the transmissions especially being a function of the type of filter and the position of the latter relative to the glass-ceramic (in the simplest case, in particular neglecting reflections at the interfaces, and to a first approximation $T_T(\lambda)=T_F(\lambda)\times T_v(\lambda)$ where $|T_T(\lambda)-T_{Vmin}|\leq 0.1$ for example). The filter is then formed by combining, if required, a number of existing filters or by producing a suitable filter empirically by way of a succession of tests that allow the required $T_F(\lambda)$ (transmission spectrum) to be obtained, or by numerical/algorithm-based optimization, etc. of the (filter) variables having an effect on the transmission (for example: pigment concentration, pigment type, thickness of the filter, in the case for example of an absorption filter obtained using pigments; or, number of films, refractive index of each material, thickness of the filter, in the case of dichroic filter, etc.), these variables, which depend on the filter chosen, being adjusted during this optimization.

In another embodiment or a variant, when the light source is set or given (the filter then depending, if needs be, on the glass-ceramic and on the source) and it is desired for the color after transmission through the glass-ceramic/filter assembly to be the same as or similar to the initial color of the source, the spectral range considered (in which $T_{Vmin}$ is in particular determined) is the emission range of the source. Alternatively, in the same way as above, a certain color dispersion may be permitted in order to maximize the final brightness perceived, by for example choosing the wavelength(s) (or wavelength interval(s)) in the emission range of the source such that the product $F_e(\lambda)\times V(\lambda)$, normalized to 1 (i.e. for each wavelength $F_e(\lambda)\times V(\lambda)$ is divided by the maximum value of $F_e(\lambda)\times V(\lambda)$ over the emission range of the source, all the values of $F_e(\lambda)\times V(\lambda)$ normalized to 1 then lying between 0 and 1), where $F_e(\lambda)$ denotes, for a given wavelength band, the energy flux spectral density of the source, is greater than 0.1.

In a third embodiment, when the light source is set or given, the filter may be defined so as to obtain a target color that is different to the initial color of the source after transmission through the glass-ceramic/filter assembly. In this case, the calculations are not, as above, based on the value of $T_{Vmin}$ but instead the color coordinates ($x_c$, $y_c$) of the desired target color are determined according to the CIE (1931) model and a filter is sought allowing the color coordinates (x, y) associated with the energy flux $T_T(\lambda) \times F_e(\lambda)$ emitted by the source/filter/glass-ceramic assembly to be obtained such that the value $d=((x-x_c)^2+(y-y_c)^2)^{1/2}$ is minimized and in particular is 0.05 or less, preferably 0.01 or less and even more preferably 0.005 or less. If, as is possible, several filters are identified, due to metamerism (identical colors being seen under a given illuminant), the selection may be further refined especially by choosing the solution/filter that gives the highest final luminous flux (for example maximizing $K \times \int T_T(\lambda) \times F_e(\lambda) \times V(\lambda) \, d\lambda$ for $\lambda$ values between 380 and 780 nm, K being a constant equal to 683 lm/W for photopic vision (luminous flux perceived by the eye for a 1 W light source emitting at 555 nm).

Starting with the color coordinates (x, y) thus determined it is again possible to calculate the transmission $T_F(\lambda)$ of the required filter, the relationships once more depending on the type of filter and on the position of the latter relative to the glass-ceramic. The filter is produced from existing or bespoke filters by, if required, combining a number of filters, the choice being made, as above, empirically via a succession of tests used to meet/obtain the required transmission criteria/spectrum $T_F(\lambda)$, or by numerical/algorithm-based optimization, etc., of the (filter) variables having an effect on the transmission, these variables, which depend on the filter chosen, being adjusted during this optimization.

Examples of filter selections or operations adjusting said variables in order to enable filter selection are given below. In the preferred case where absorption filters are used, when these filters are formed by depositing a blend of pigments dispersed in a medium, and if N absorbing species (pigments and medium) are blended when they are applied to the underside of the glass-ceramic plate, the optimal composition of this colored blend may be identified depending on the desired objective (neutral transmission, same or different color to the initial color of the source) using Beer's law, which gives the absorbance A for a blend of N absorbent species:

$$A(\lambda) = \sum_{i=1}^{N} \varepsilon_i(\lambda) l C_i$$

where $\varepsilon_i$ is the molar absorptivity of each species, l the length of the optical path through the mixture, and $C_i$ the molar concentration of each species. The transmission $T_T(\lambda, C_1, \ldots, C_N)$ of the assembly (variable composition blend+ glass-ceramic) is then modeled. Depending on the chosen operating mode (universal filter or a filter for a given glass-ceramic and source, the target color being or not being identical to the source color) it is then possible to attempt to optimize ($C_1, \ldots, C_N$) such that $|T_T(\lambda)-T_{Vmin}| \leq 0.1$, or to calculate the color coordinates $(x(C_1,\ldots,C_N), y(C_1,\ldots,C_N))$ associated with the transmitted flux $T_T(\lambda, C_1, \ldots, C_N) \times F_e(\lambda)$ and then optimize ($C_1, \ldots, C_N$) such that $d=((x-x_c)^2+(y-y_c)^2)^{1/2} \leq 0.05$ as explained above.

The invention also relates to a method for selecting (and/or adjusting) at least one filter for production of glass-ceramic(s) (glass-ceramic plate(s)) having at least one colored luminous zone, in particular a display zone, such as explained above, depending on the required objective.

As already mentioned, each filter may be added, or optionally integrated into a component of the article, and is positioned relative to (coupled to) the plate and the corresponding source so as to correct luminous transmission through the glass-ceramic. For example, the filter may be added to/deposited on/fixed to the glass-ceramic, especially by adhesive bonding, deposition (a layer acting as the filter) by laser or ink-jet printing, screen printing, spraying, etc., preferably on the lower face of the glass-ceramic. The filter may also be fixed between the source/display unit and the glass-ceramic, or optionally mounted on the source/display unit (by deposition, adhesive bonding, encapsulation, capping, etc.). In the particular case where at least one light source is combined with at least one waveguide, the filter may be inserted between the light source and the surface where light is injected into the waveguide, or be added to the lower surface of the glass-ceramic plate, in the zones to be illuminated. Generally only one type (absorption, reflection, etc.) of filter is used per glass-ceramic but optionally a number of filter types may be used conjointly. Furthermore, each filter may be processed depending on the particular circumstances and the desired objective, as mentioned in the above text regarding selection methods and more specifically illustrated in the examples, especially when the filters are obtained by depositing one or more layers, for example on the glass-ceramic, or are based on an existing filter that is modified as required (for example by changing its thickness), and/or it is possible to select appropriate commercially available filters or combinations of filters used in other fields.

The source/filter/glass-ceramic combination allows a white or color display to be obtained through the glass-ceramic, which makes it possible to obtain luminous effects that are particularly desirable in design terms. The article according to the invention may thus have one or more luminous/display zones for functional and/or decorative purposes (graphic, logo, alphanumeric symbol, etc.) generally visible on the main faces (especially the upper face) of the glass-ceramic substrate. Said zone or zones may be located in any zone of the plate (including heatable zones), and provision may be made for a number of different luminous/display zones (different colors, brightnesses) and/or each zone may itself exhibit various colors, for example one zone may be bicolored.

The article according to the invention may, if required, comprise elements and/or layers other that the aforementioned components. For example, when it is a cooking module, the article may be equipped with (or associated with) one or more additional functional or decorative elements (frame, connectors, cables, control elements), etc. It may comprise various functional and/or decorative coatings based on enamel, paint, etc. For example, one of the faces of the substrate may comprise a decorative enamel layer, a masking layer (for example preventing direct observation of the sources), or a layer having another function (for making the illumination more uniform, etc.).

The invention also relates to appliances (or devices) for cooking and/or for maintaining a high temperature comprising at least one article according to the invention (for example, cookers, stoves, ovens, etc.) and comprising, if required, one or more heating elements such as one or more radiant or halogen elements and/or one or more gas burners and/or one or more induction heaters. The article according to the invention may also consist of a cooking appliance comprising one or more heating elements other than the elements mentioned above in the definition of the invention. The invention also encompasses cooking appliances comprising a single plate and appliances comprising a number of plates, each of these plates providing, as required, a single ring or multiple rings. The term "ring" is understood to mean a location for cooking. The invention also relates to mixed cooking appliances, the one or more hotplates of which comprise a number of ring types (gas rings, radiant or halogen or induction rings). Furthermore, the invention is not limited to the manufacture of cooking plates or modules for cookers or stoves. The articles manufactured according to the invention may also be other flat modules or plates that need to be largely insensitive to temperature variations.

The cooking appliance, in addition to the internal heating elements, also generally comprises control means and, since the internal elements are covered by the glass-ceramic substrate, the display, in a color other than red, being seen through said substrate, there is provided, if required, on a face or inside of the substrate, at least one masking means intended to mask at least one part of said is internal elements.

The present invention also relates to a process for manufacturing an article according to the invention, in which at least one filter such as mentioned above, according to the invention, in particular chosen using the selection method described above, is inserted between the glass-ceramic plate and at least one source. This filter may be inserted in the form of an independent element (for example the filter is added, in particular it is joined to the glass-ceramic substrate or the source) or in the form of a layer deposited on the source or glass-ceramic substrate as described above. Advantageously, this filter is inserted after the precursor glass (green glass) has been ceramified so as to obtain the glass-ceramic substrate.

It will be recalled that glass-ceramic plates are generally manufactured in the following way: glass having the composition chosen for the glass-ceramic is melted in a melting furnace, then the molten glass is rolled into a standard strip or sheet by passing the molten glass between rollers, and the glass strip is cut to the required dimensions. The plates thus cut are then ceramified in a way known per se, the ceramization consisting of firing the plates using a temperature profile chosen to convert the glass into the polycrystalline material called "glass-ceramic", glass-ceramics having a thermal expansion coefficient of zero or almost zero and withstanding thermal shocks of as much as 700° C. Ceramization generally comprises a step in which the temperature is gradually increased until the nucleation range is reached, this range generally being located in the vicinity of the glass conversion range; a step of passing through the nucleation range over several minutes; a further progressive rise in the temperature up to the ceramization hold temperature, the ceramization hold temperature being maintained for several minutes; followed by rapid cooling to room temperature. Where appropriate, the process also includes a cutting operation (generally before ceramization), for example using a water jet, mechanical scoring using a scoring wheel, etc., followed by a fashioning operation (grinding, beveling, etc.).

The invention also relates to the use of at least one filter (in a luminous device integrated into a glass-ceramic article) to obtain an article having at least one colored luminous zone, in particular a display.

BRIEF DESCRIPTION OF THE SEVERAL VIEWS OF THE DRAWINGS

Other details and advantageous features will become apparent on reading the description of nonlimiting embodiments of the invention, given with reference to the appended figures in which.

EXAMPLE 1

Figure 1:
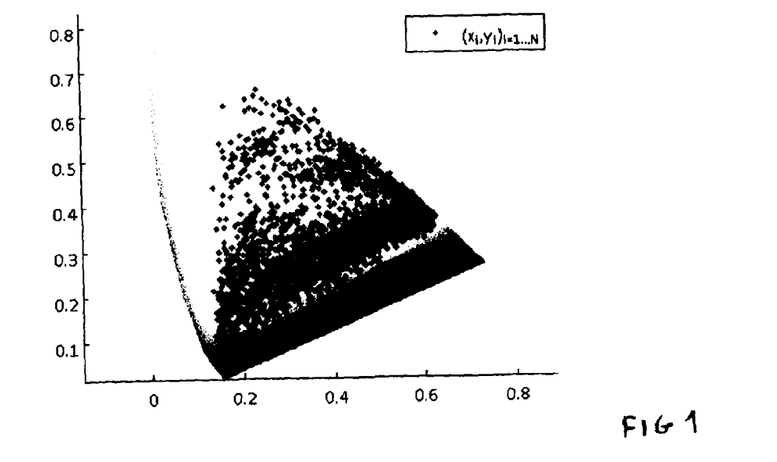
FIG. 1 shows, displayed on a CIE (1931) color space, all the points $(x_i, y_i)_{i=1...N}$ that can be produced using a combination of two color filters fixed to the lower face of a glass-ceramic placed on a light source, in order to select the filter combination allowing the target color to be obtained by transmission of the emitted light though the filter combination/glass-ceramic plate assembly.

In the embodiment of the article according to the invention associated with FIG. 1, the article in question is a flat cooking module comprising a glass-ceramic plate (substrate) sold under the trade name KeraVision by Eurokera, this plate having a smooth upper face and a smooth lower face (this face possibly also being provided with studs) and a thickness of 4 mm, the article furthermore comprising a display unit (light source) comprising white LEDs (7-segment display unit) sold under the reference HDSM-431W by Avago Technologies, and also comprising a combination of two filters chosen from the range of filters sold by Lee Filters (such as the color filters for lighting referenced Lee Filters 131 and 103) or by Rosco, the light source being fixed under the plate, and the filters, added below the glass-ceramic plate, being located between the source and the plate. In operation the source emits a light beam that passes through the filters/plate assembly in the display zone. The distance between the source and the plate is less than or equal 5 mm, it may especially be less than 2 mm and even less than 1 mm.

The filters are chosen in the following way: it is desired to obtain, through the plate, a display with a warm white color (target color coordinates $x_c=0.35$, $y_c=0.34$) using a white display unit the initial color coordinates of which have also been measured to be $(x_0=0.33\pm0.01, y_0=0.33\pm0.01)$. Two catalogues of absorption color filters, produced by Lee Filters and Rosco, are available, these filters taking the form of colored (PET) polymer films. It sought to determine which filter(s) to insert between the display unit and the glass-ceramic plate to obtain the target color.

The energy flux density $F_e(\lambda)$ of the source and the spectral optical transmission of the filters and the glass-ceramic are measured (the transmission measurements being carried out on the glass-ceramic plate, the textured face (studs) of which has been removed by polishing if necessary, using an integrating sphere, for example the SPH-12-X model from SphereOptics, coupled to a spectrometer, for example the CAS140 model from Instrument Systems). In particular $(T_f(\lambda))_{i=1...N}$ is evaluated for the N one or more Lee Filters or Rosco color filters it is envisioned will be combined with the glass-ceramic plate, and then the color coordinates $(x_i, y_i)_{i=1 \ldots N}$ corresponding to the transmitted flux $(T_T(\lambda)_x F_e(\lambda))_{i=1 \ldots N}$ are calculated and all these points are plotted on the CIE (1931) color space (FIG. 1). The combinations of filters allowing color coordinates (x, y) associated with the energy flux $T_T(\lambda) \times F_e(\lambda)$ emitted by the source/filters/glass-ceramic assembly to be obtained such that the value $d=((x-x_c)^2+(y-y_c)^2)^{1/2}$ is minimized and in particular is 0.05 or less, preferably 0.01 or less and even more preferably 0.005 or less, are noted.

It will be observed that the use of only one filter catalogue would not allow d to be minimized within fixed limits. In contrast, it has been observed that combining two Lee Filters filters, in the case in hand filters 103 and 131, with the given glass-ceramic plate and display unit, allows the desired target color to be obtained. The figure also provides all the (target) colors that can be produced with a selection of filters from the Lee Filters catalogue for a given white display unit.

EXAMPLE 2

Figure 2A:
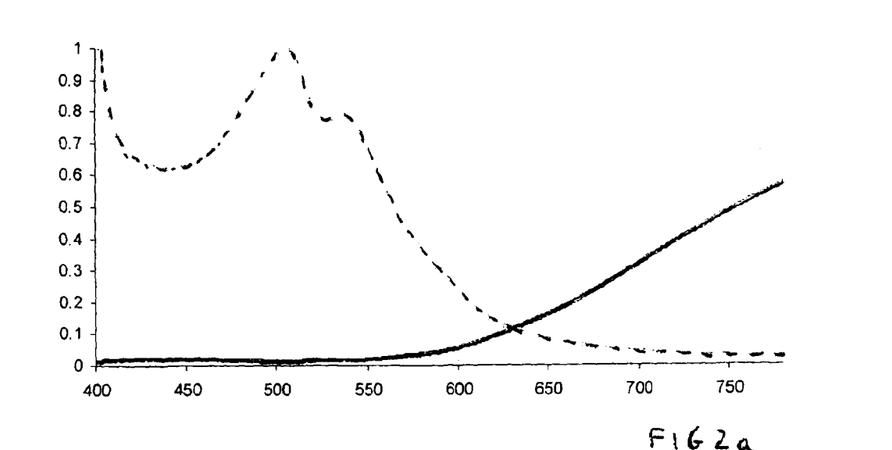
FIG. 2a shows, for another embodiment of the invention (use of a universal filter), the respective optical transmission spectra of a glass-ceramic plate and the chosen universal filter specific to this glass-ceramic, FIG. 2b showing the optical transmission of the combination of these two.
Figure 2B:
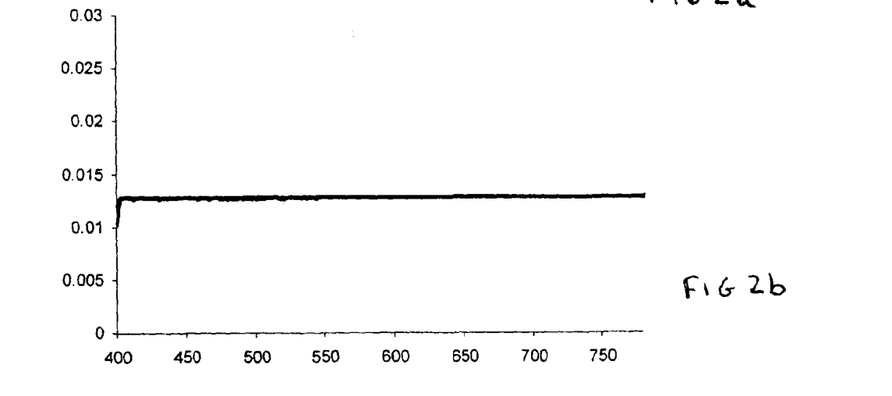
Figure 3:
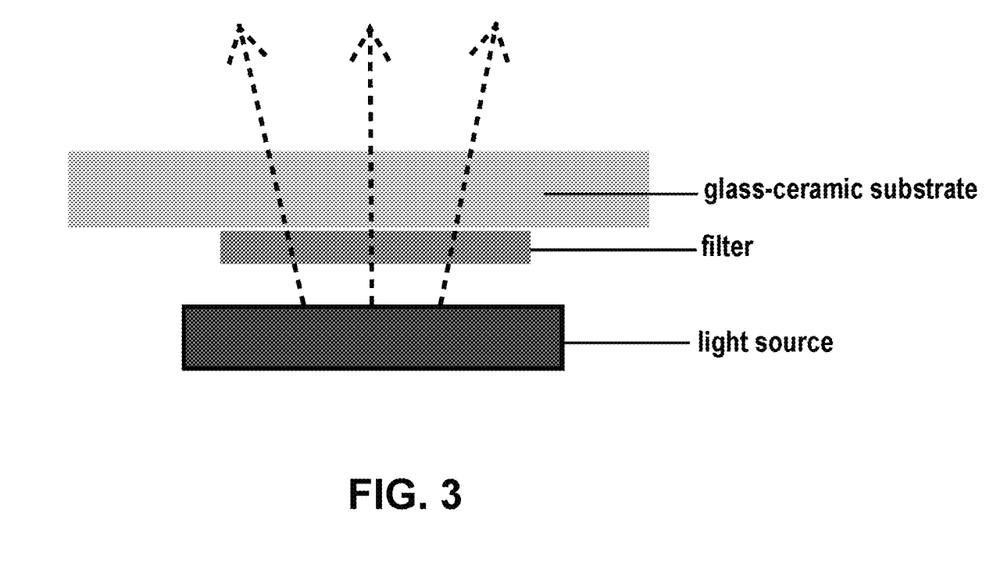
FIG. 3: An article according to the invention comprising: a glass-ceramic substrate having a luminous transmission ranging from 0.8% to 40% and an optical transmission of at least 0.1% for at least one wavelength in the range extending from 420 to 780 nm; a light source; and a filter so as to form at least one colored luminous zone, in particular a display zone, in at least one zone of the glass-ceramic substrate.
Figure 4:
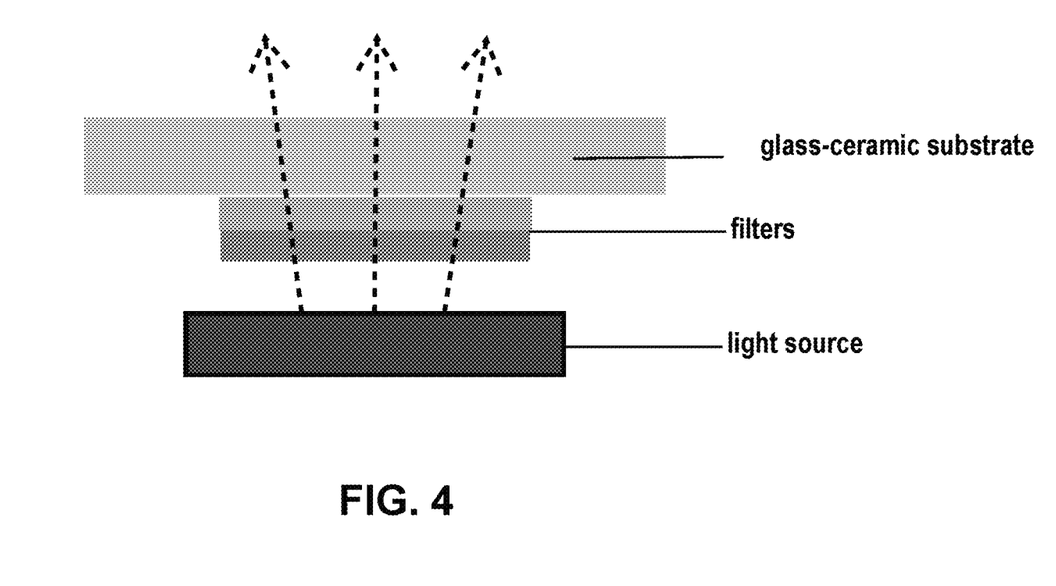
FIG. 4: An article according to the invention in which one or more filters provide a target color that is identical to or different from the initial color of the light source.
Figure 5:
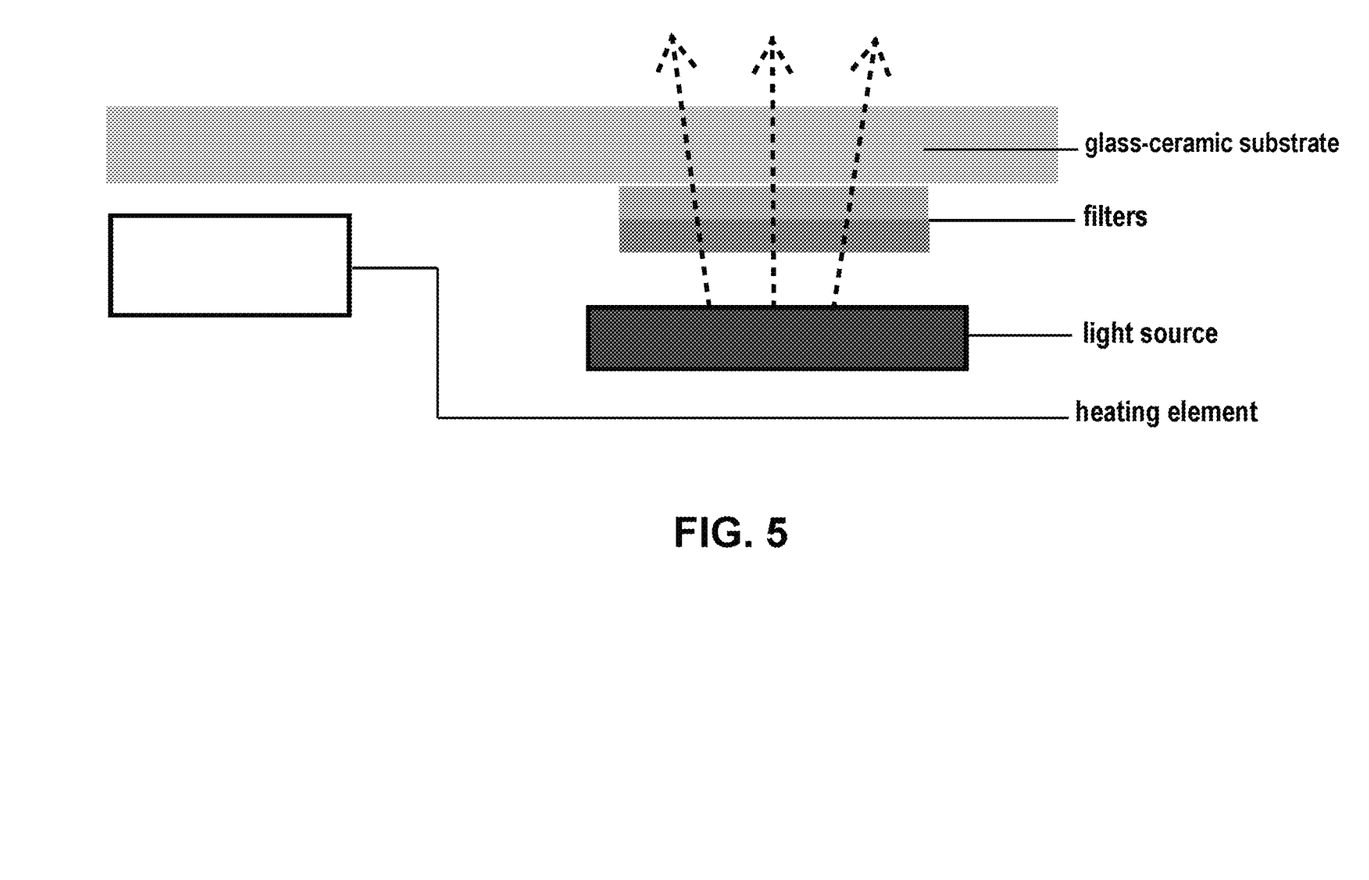
FIG. 5: An article according to the invention comprising a heating element.

FIG. 2a shows (the Y-axis giving the (optical) transmission, i.e. the ratio of the transmitted luminous intensity to the intensity of the incident beam, as a function of the wavelength in nanometers, X-axis, of the incident beam) transmission spectrums (or spectral dispersions) for the above Keravision glass-ceramic plate (solid line), for the universal filter (dotted line) specific to the glass-ceramic, selected as indicated above, and for the combined plate and filter (FIG. 2b). This combination does not alter the color of a source, whatever its spectrum, to the total transmission of the glass-ceramic+filter assembly being approximately constant or flat.

As a universal filter, in the present example a reflection filter will be sought, this filter consisting of a dichroic multilayer deposited on a glass substrate, this filter especially providing a white rendering at normal incidence when it is associated with a white 7-segment Avago HDSM.441W display unit and the aforementioned 4 mm-thick KeraVision glass-ceramic, when inserted between the display unit and the glass-ceramic.

To design such a filter by making the appropriate selection of high and low refractive index films deposited in alternation on the substrate employed, $T_T(\lambda)$ is for example modeled for an interferential multilayer composed of $TiO_2$ and $SiO_2$ films deposited in alternation on the aforementioned 4 mm-thick smooth/smooth Keravision plate. The optical properties of the multilayer thus produced are for example calculated following the method described in "Macleod, H. A., *Thin Film optical Filters*. 3rd ed. 1986". The number of films and their thicknesses are variables which are optimized in order to minimize $T_T(\lambda)-T_{Vmin}$, the minimum optical transmission $T_{Vmin}$ of the glass-ceramic in the spectral range considered (here 420-780 nm) having been determined beforehand (this optical transmission minimum being located at 420 nm and being equal to 0.013 (1.3%)). The table below presents the result of this optimization, the film 1 being the first film of the multilayer (located adjacent the glass-ceramic substrate).

is shown by the dots in FIG. 2a, as already mentioned, FIG. 2b illustrating the result obtained (transmission $T_T$ at normal incidence of the plate+10 $TiO_2$ and $SiO_2$ film multilayer presented in the above table).

This universal filter makes it possible to preserve the color of the source whatever the source used. A filter (having a effect) similar to the aforementioned filter, under the operating conditions defined above, is also sold under the reference C04 by Lee Filters.

EXAMPLE 3

In this preferred variant of the preceding examples, it is sought to develop a universal absorption filter specific to the KeraVision plate of the preceding examples, the filter especially being suited to obtaining a white rendering with the plate and the display unit mentioned in example 1. To do this, the glass-ceramic is substrate is printed using an ink-jet printing technique. The inks uses are UV-curable inks that are temperature and light stable, such as the Anapurna M inks sold by Agfa. After the transmission of the universal filter suited to the 4 mm-thick KeraVision glass-ceramic has been calculated, the L*a*b* color coordinates of this filter are calculated in the CIE L*a*b* color system, then this filter is printed, by ink-jet printing, onto the lower face of the glass-ceramic by inputting these L*a*b* color coordinates into a software program that controls the colors of the printer (for example an Anapurna M printer with an at least four-pass printing configuration) the software incorporating for example a database relating the L*a*b* coordinates to the combinations of printer colors defined for the selected substrate (the filter resulting from a mixture of the printer colors)

EXAMPLE 4

In this preferred variant of the preceding example, it is also sought to develop a universal absorption filter specific to the KeraVision plate of the preceding examples, and especially appropriate for obtaining a white rendering with the plate and the display unit mentioned in example 1, but this time by selecting pigment blends. To do this, a blend of the pigment α-copper phthalocyanine PB-15:2 (for example sold by BASF under the reference Heliogen Blue L 6875 F) and the pigment polychlorinated copper phthalocyanine PG7 (for example sold by BASF under the reference Heliogen Green L 8730) is used, the blend being incorporated in a transparent silicone resin (curable polysiloxane resin containing mineral fillers such as silica). Beer's law numerical optimization (after transmission spectra have been measured, for a given deposition thickness, here 25 μm, representing the optical path length, for each pigment incorporated alone in the transparent silicone resin, at various concentrations, and for the transmission spectrum of the transparent resin alone, at a thickness of 25 μm) is used to calculate the blend that will produce a universal filter suited to the 4 mm-thick KeraVision glass-ceramic. The pigment blend containing 0.06 wt %

|  | film | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| material | $TiO_2$ | $SiO_2$ | $TiO_2$ | $SiO_2$ | $TiO_2$ | $SiO_2$ | $TiO_2$ | $SiO_2$ | $TiO_2$ | $SiO_2$ |
| thickness (nm) | 88.17 | 128.92 | 90.03 | 108.87 | 64.83 | 104.83 | 96.14 | 76.05 | 89.25 | 104.61 |

The optical transmission spectrum of the filter consisting of the 10-film multilayer obtained by the above optimization Heliogen Blue L 6875 F and 0.74 wt % Heliogen Green L 8730 in a transparent silicone resin applied (preferably by screen printing) in a 25 μm-thick layer to the lower face of the plate allows, after baking for one hour at 250° C., a white color (x=0.34, y=0.33) to be obtained by transmission of the light emitted by the aforementioned Avago HDSM.431W display unit through the colored deposit/glass-ceramic assembly.

EXAMPLE 5

In this example, in which it is desired to preserve, through the aforementioned plate, the color of the aforementioned white Avago display unit, a 3.04 mm-thick absorption color filter referenced Schott BG39 and sold by Schott (this filter especially being used in photography) is placed between the display unit and the glass-ceramic plate; this filter "overcorrects" the color dispersion introduced by the glass-ceramic, the display color of the source/filter/glass-ceramic plate assembly being blue.

The thickness and the transmission of the BG39 filter used are then experimentally measured. Beer's law makes it possible to model the effect of the thickness d of the filter on the internal transmission $T_i$ of the medium, accordingly $T_{i,d_1}(\lambda) = T_{i,d_2}(\lambda)^{d_1/d_2}$.

The transmission $T_T(\lambda,d)$ of the assembly (filter of variable thickness d+glass-ceramic plate) is then modeled and the color coordinates (x(d),y(d)) associated with the transmitted flux $T_T(\lambda,d) \times F_e(\lambda)$ are calculated. Finally, the value of d that allows $d=((x(d)-x_c)^2+(y(d)-y_c)^2)^{1/2}$ to be minimized is identified. Thus it is found that when d=(0.58× the initial thickness) mm, i.e. d=1.76 mm, the initial color of the display unit (x=0.33, y=0.32) is once more obtained.

The articles, in particular plates, according to the invention may in particular be advantageously used to produce a new range of hotplates for cookers or ranges, but may also be advantageously used to produce wall elements or walls (for example the doors or parts of doors) of ovens, etc.

The invention claimed is:

1. An article having at least one colored luminous zone, said article comprising:
   a glass-ceramic substrate having a luminous transmission ranging from 0.8% to 40% and an optical transmission of at least 0.1% for at least one wavelength in the range extending from 420 to 780 nm,
   a light source and
   a filter,
   so as to form at least one colored luminous zone, in at least one zone of the glass-ceramic substrate.

2. The article of claim 1, characterized in that the filter is chosen depending on the glass-ceramic substrate and possibly on the light source, so as to form the at least one luminous zone, which has a color other than red.

3. The article of claim 1, characterized in that the filter is an optical filter and the filter is fastened to the light source and/or the glass-ceramic substrate.

4. The article of claim 1, characterized in that the filter is an absorption filter.

5. The article of claim 1, characterized in that filter is a reflection filter.

6. The article of claim 1, characterized in that the filter is a filter that compensates a transmission of the glass-ceramic substrate so that the glass-ceramic substrate/filter assembly has a total optical transmission that is approximately constant in the chosen spectral range.

7. The article of claim 1, characterized in that one or more filters are used to obtain a target color that is identical to or different from an initial color of the light source.

8. The article of claim 1, characterized in that the filter has a luminous transmission of at least 5%.

9. The article of claim 1, characterized in that the filter is obtained by ink-jet printing.

10. The article of claim 1, further comprising:
    a heating element.

11. A method for selecting at least one filter for producing the article of claim 1 having at least one colored luminous zone, according to which a minimum transmission $T_{Vmin}$ of the glass-ceramic substrate is determined in a spectral range considered, and a filter is sought allowing a constant total transmission value $T_T(\lambda)$ for the glass-ceramic substrate/filter(s) assembly equal to Tvmin to be obtained whatever a wavelength in the spectral range considered, with a difference $T_T(\lambda) - T_{Vmin}$ less than or equal to 0.1.

12. A method for selecting at least one filter for producing the article of claim 1 having at least one colored luminous zone, according to which the color coordinates (xc, yc) of a desired target color are determined and a filter is sought allowing color coordinates (x,y) associated with an energy flux $T_T(\lambda) \times F_e(\lambda)$ emitted by the light source/filter/glass-ceramic substrate assembly to be obtained such that a value $d=((x-x_c)^2+(y-y_c)^2)^{1/2}$ is less than or equal to 0.05.

13. A process for manufacturing an article according to claim 1, in which the filter is inserted between the glass-ceramic substrate and the light source.

14. The article of claim 1, characterized in that the at least one colored luminous zone is a display zone.

15. The article of claim 2, characterized in that the at least one luminous zone is a colored zone having a white color and/or a synthetic color obtained by a mixing with several wavelengths.

16. The method of claim 11, characterized in that the at least one colored luminous zone is a display zone.

17. The method of claim 12, characterized in that the at least one colored luminous zone is a display zone.

* * * * *